(12) United States Patent
Liu et al.

(10) Patent No.: US 9,269,009 B1
(45) Date of Patent: Feb. 23, 2016

(54) USING A FRONT-FACING CAMERA TO IMPROVE OCR WITH A REAR-FACING CAMERA

(71) Applicant: Amazon Technologies, Inc., Reno, NV (US)

(72) Inventors: Yue Liu, Brighton, MA (US); Sonjeev Jahagirdar, Somerville, MA (US); Matthew Joseph Cole, Arlington, MA (US); Utkarsh Prateek, Natick, MA (US); Emilie Noelle McConville, Boston, MA (US); Daniel Makoto Wilenson, Somerville, MA (US); Avnish Sikka, Acton, MA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/283,115

(22) Filed: May 20, 2014

(51) Int. Cl.
*G06K 9/18* (2006.01)
*G06K 9/00* (2006.01)

(52) U.S. Cl.
CPC .............. *G06K 9/18* (2013.01); *G06K 9/00302* (2013.01); *G06K 2209/01* (2013.01)

(58) Field of Classification Search
CPC ......... G06K 9/18; G06K 9/186; G06K 9/228; G06K 2209/01; G06K 9/036
See application file for complete search history.

(56) References Cited

U.S. PATENT DOCUMENTS

| | | | |
|---|---|---|---|
| 2004/0057619 A1* | 3/2004 | Lim et al. | 382/182 |
| 2009/0185236 A1* | 7/2009 | Zeng | 358/450 |
| 2013/0044233 A1* | 2/2013 | Bai | 348/222.1 |
| 2013/0330007 A1* | 12/2013 | Kim et al. | 382/195 |
| 2014/0270357 A1* | 9/2014 | Hampiholi et al. | 382/103 |
| 2014/0293370 A1* | 10/2014 | Loi et al. | 358/475 |

OTHER PUBLICATIONS

Cohen, et al, "Facial Expression Recognition from Video Sequences: Temporal and Static Modeling," Computer Vision and Understanding 91 (2003), pp. 160-187.*

* cited by examiner

*Primary Examiner* — Bhavesh Mehta
*Assistant Examiner* — Pinalben Patel
(74) *Attorney, Agent, or Firm* — Seyfarth Shaw LLP; Ilan N. Barzilay; Vamsi K. Kakarla

(57) ABSTRACT

Various embodiments enable a computing device to incorporate frame selection or preprocessing techniques into a text recognition pipeline in an attempt to improve text recognition accuracy in various environments and situations. For example, a mobile computing device can capture images of text using a first camera, such as a rear-facing camera, while capturing images of the environment or a user with a second camera, such as a front-facing camera. Based on the images captured of the environment or user, one or more image preprocessing parameters can be determined and applied to the captured images in an attempt to improve text recognition accuracy.

20 Claims, 16 Drawing Sheets

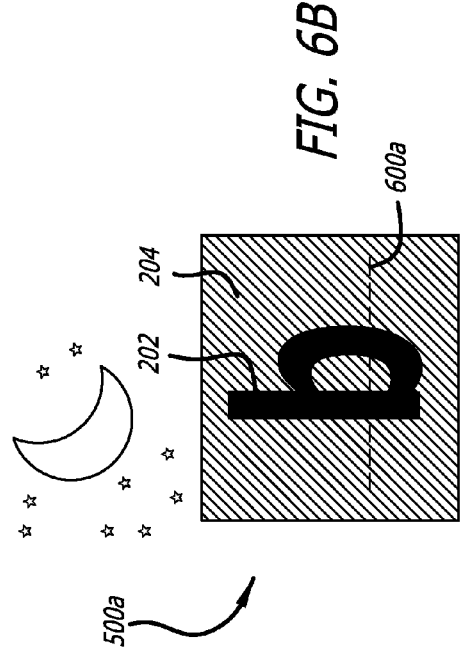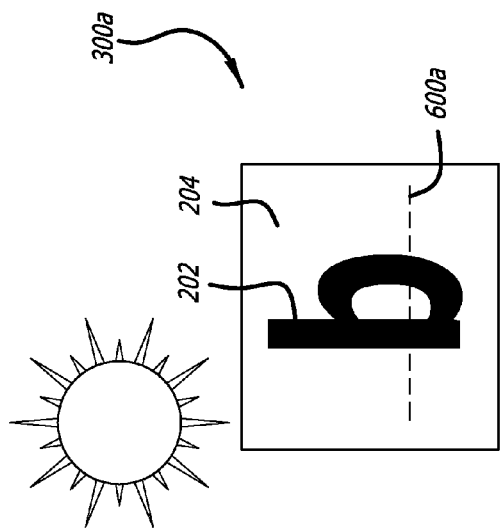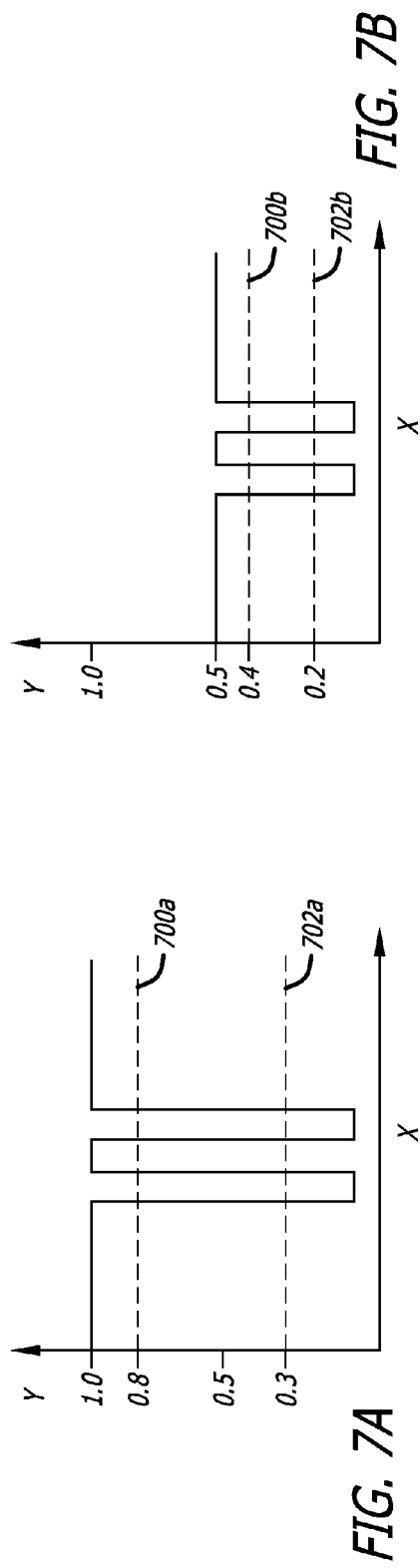

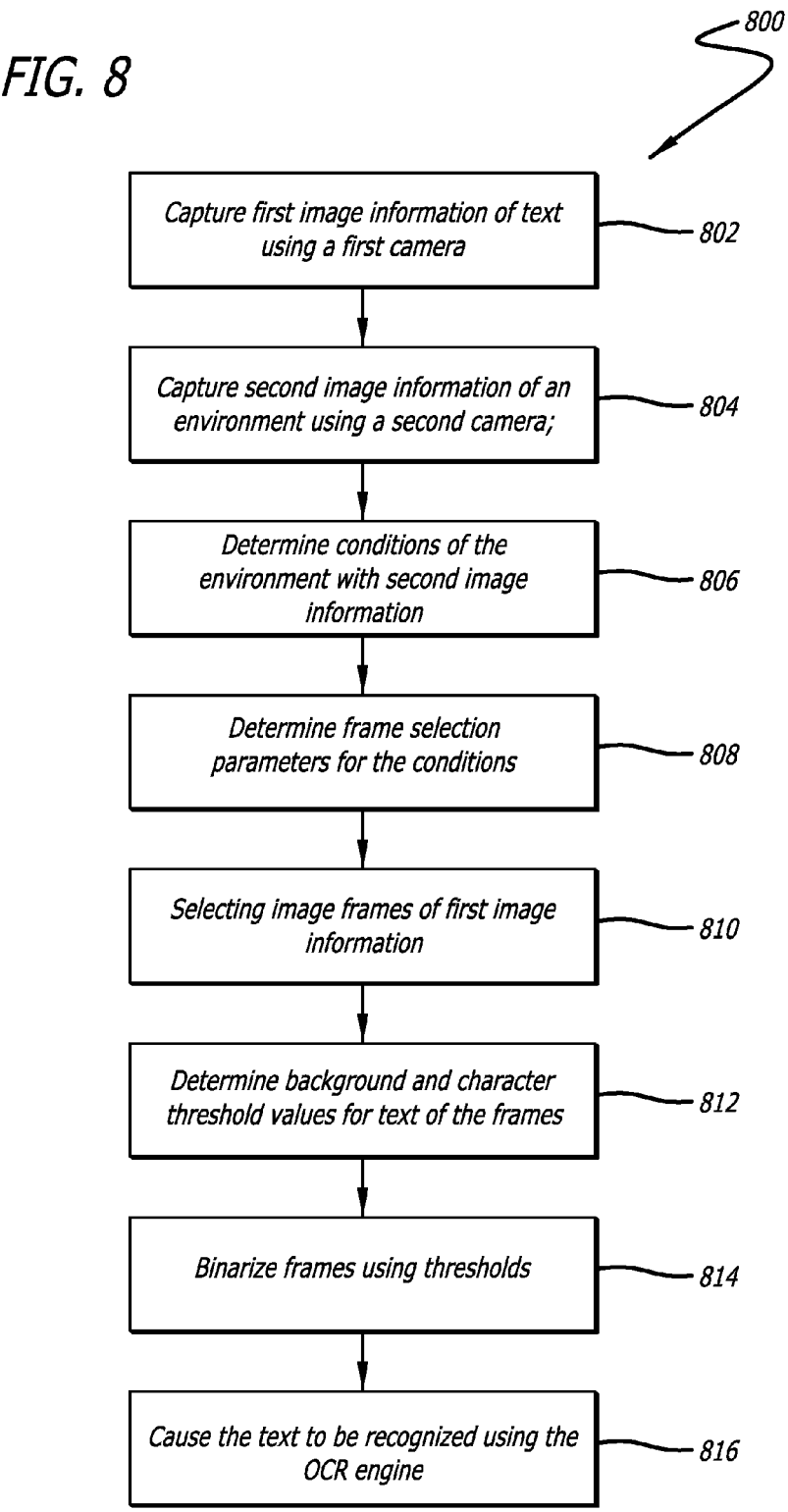

FIG. 11A
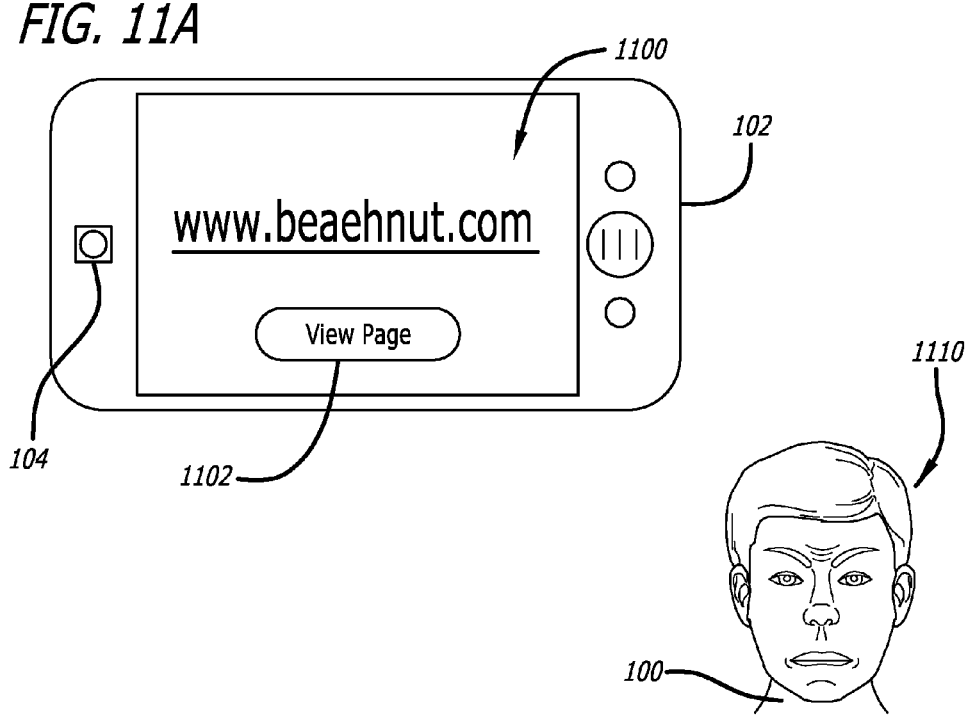
FIG. 11B
FIG. 11C
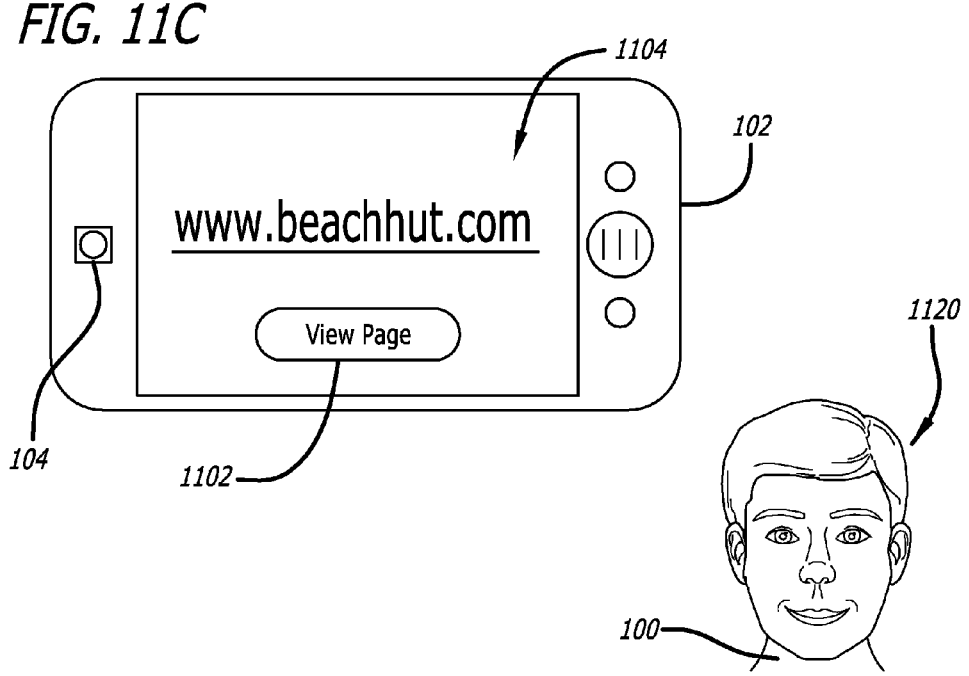
FIG. 11D

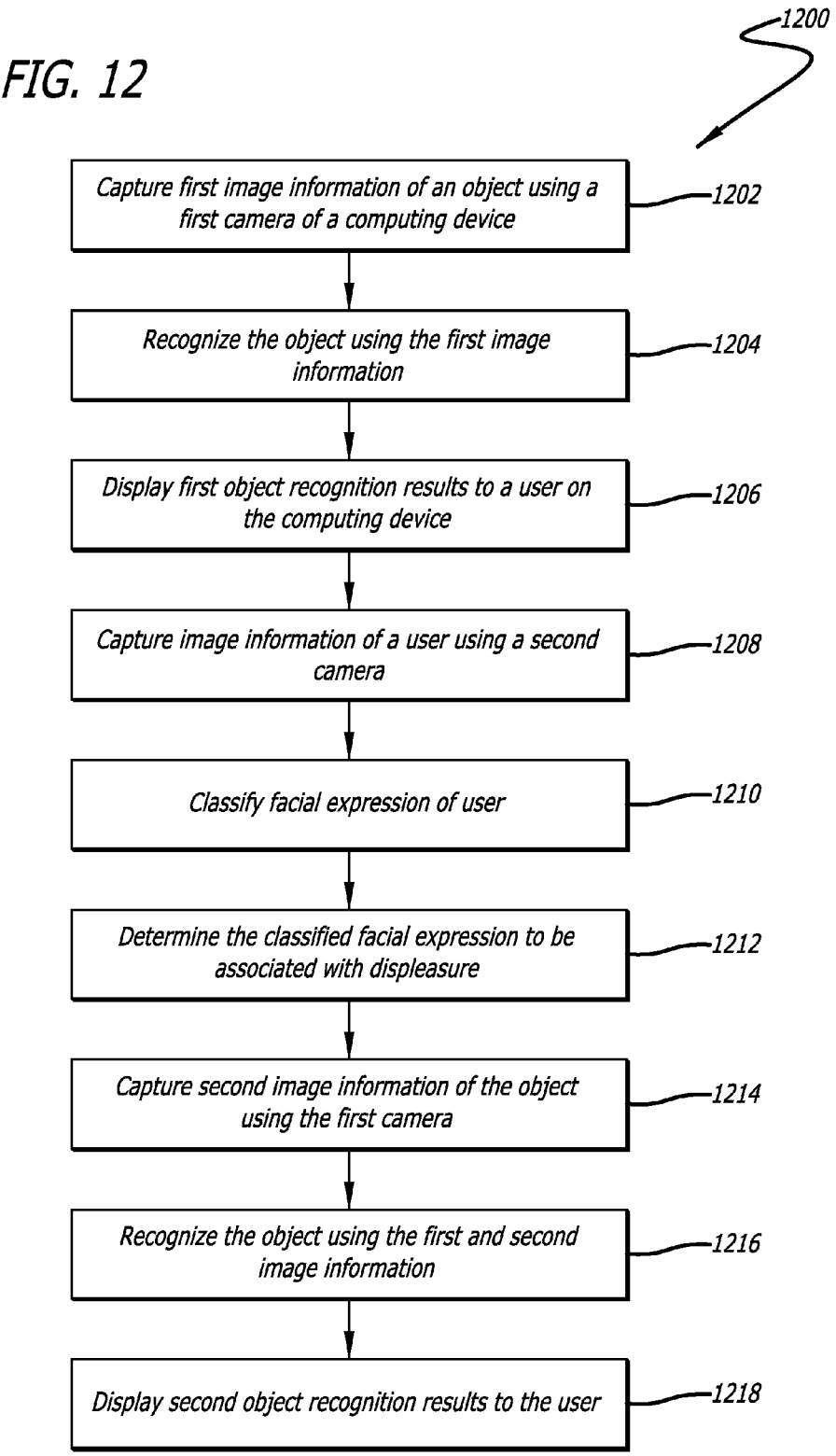

USING A FRONT-FACING CAMERA TO IMPROVE OCR WITH A REAR-FACING CAMERA

BACKGROUND

Optical character recognition (OCR) systems are generally used to convert image information (e.g., scanned images, photos, etc.) containing text to machine-encoded data. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters.

With the introduction of more powerful and capable mobile computing devices (e.g., smartphones, phablets, tablet computing devices, etc.), applications that were traditionally found on desktop computing devices or servers are being implemented for running on mobile computing devices. For a given OCR implementation adapted for use on a mobile computing device, a set of challenges are presented as mobile computing devices are used in different physical environments and have a more limited set of resources that may require a more efficient OCR implementation to optimally run on a given mobile computing device. As technology advances and as people are increasingly using mobile computing devices in a wider variety of ways, it can be advantageous to adapt the ways in which images are processed by an OCR engine in order to improve text recognition.

BRIEF DESCRIPTION OF THE DRAWINGS

Various embodiments in accordance with the present disclosure will be described with reference to the drawings, in which:

FIGS. 6A and 6B illustrate example magnified views of a portion of an image captured during the day and a portion of an image captured at night in accordance with various embodiments;

FIGS. 7A and 7B illustrate example threshold values for different lighting or environmental conditions in accordance with various embodiments;

FIG. 8 illustrates steps of an example process for adjusting image processing parameters for text recognition using input from a secondary camera in accordance with some embodiments;

FIGS. 11A-11D illustrate an example process wherein a computing device processes additional image frames based on user facial expressions in accordance with at least one embodiment;

FIG. 12 illustrates steps of an example process for processing additional image frames based on user facial expressions in accordance with some embodiments;

DETAILED DESCRIPTION

Figure 1:
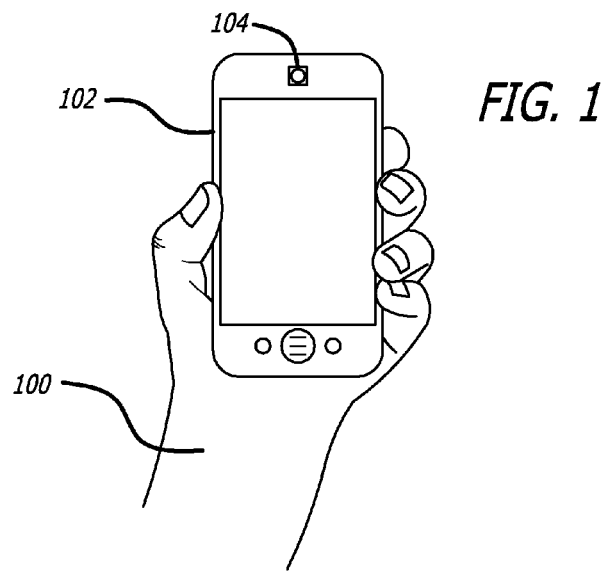
FIG. 1 illustrates an example computing device in accordance with at least one embodiment.

Systems and methods in accordance with various embodiments of the present disclosure may overcome one or more of the aforementioned and other deficiencies experienced in conventional approaches to recognizing one or more objects in an image. In particular, various approaches enable information of an environment and/or a user to be collected and used as an input for setting and/or adjusting parameters for text or object recognition.

A mobile computing device can perform tasks such as processing an image to recognize and locate text in the image, and providing the recognized text to an application executing on the device for performing a function (e.g., calling a number, opening a web browser, etc.) associated with the recognized text. Since the computing device is mobile, user are expected to capture images of such text in a variety of situations (e.g., indoors and outdoors, near objects like newspapers and far objects like billboards, during the day and at night, etc.) and being able to recognize text in each of these situations and others can be a challenge for many Optical Character Recognition (OCR) algorithms. For example, outdoors during the day, items may be brightly lit, but specular reflections on glossy surfaces can interfere with an algorithm's ability to accurately recognize the text. By contrast, indoor lighting can be dim and objects in the environment can create shadows that can also interfere with the algorithm's ability to accurately recognize the text. Determining that the computing device is in a particular environment, such as in a restaurant or in a particular location, may also be used to improve the OCR results. For example, depending on the environment or location, the computing device could select an appropriate OCR dictionary for the environment. Each environment or situation, therefore, can present a different challenge for OCR algorithms.

Accordingly, various frame selection and preprocessing techniques can be incorporated into a text recognition pipeline in an attempt to improve text recognition accuracy across each of these differing environments and situations. For example, a mobile computing device can capture images of text using a first camera, such as a rear-facing camera, while capturing images of the environment with a second camera, such as a front-facing camera. Alternatively, the front-facing camera can be used to capture text and the rear-facing camera can be used to capture images of the environment, or two cameras can be used that face different directions, such as an up facing camera or a side facing camera. The images of the environment can then be analyzed to determine, for example, whether the text in the images is being captured outdoor, indoor, under high lighting conditions, low lighting conditions, in an environment with a single light source or multiple light sources, and the like. Based at least in part on this determined environment, a set of frame selection parameters, that define criteria for selecting frames of the captured text, are determined. These parameters can include defined values for the focus or sharpness, intensity, contrast, number of frames to be processed, and others for a given environment. Once a number of frames at least meeting the defined parameters have been selected, a background threshold value and a character threshold value can be determined for the environment. Using these threshold values, the selected frames are binarized and subsequently analyzed by an OCR engine to recognize the text.

Further, the computing device can also provide feedback to the user in order to improve the text recognition results. For example, based at least in part on analyzing shadows in an image, the computing device may be able to determine whether the images are being captured from a location between the target text (e.g., as captured by the rear-facing camera) and the brightest light source (e.g., as captured by the front-facing camera). In such an instance, the computing device can prompt the user to move the computing device or target text or to adjust the lighting in order to potentially improve the text recognition results.

In another example, recognition results for text or an object captured using the first camera can be displayed to a user while capturing images of the user's facial expressions with the second camera. The user's emotion or satisfaction with the displayed results can then be classified based on their facial expression using machine learning techniques. Based on this classification, the computing device can determine whether the user is happy or frustrated with the recognition results currently being displayed to them. If the user's facial expression indicates that they are frustrated (i.e., the results were not properly recognized), the computing device can capture and analyze an additional number of image frames and merge the results of all analyzed frames in an attempt to determine a more accurate result. Additionally, feedback can also be sent to the user based on some frame quality measurement. For example, the computing device could ask the user to move closer, move back, notify the user that the light is too dark, or the like. Further, information for misrecognized images and their corresponding results can be stored as a negative example and these examples can be investigated in an attempt to improve future recognition results. If user's facial expression, however, indicates that the user is at least content with the recognition results, the computing device can stop analyzing additional frames in order to save power and computational resources.

Various other functions and advantages are described and suggested below as may be provided in accordance with the various embodiments.

FIG. 1 illustrates an example of user 100 holding computing device 102 that can be used in accordance with various embodiments. Although a mobile computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others. Since many of these devices are hand-held, users are able to use them in a variety of situations (e.g., indoors, outdoors, at night, during the day, etc.). These varying conditions present a challenge for Optical Character Recognition (OCR) and other object recognition algorithms used to recognize text or objects from a given image. For example, objects are brightly lit outdoors on a sunny day, but specular reflections can interfere with identifications. By contrast, indoor lighting can be dim and objects in the environment (including the user and device) can occlude part or all of a light source illuminating an object. Accordingly, it can be advantageous to adjust various recognition parameters (e.g., focus, background and character thresholds, number of frames processed, OCR parameters, etc.) for a given set of conditions under which an image was captured. Accordingly, in at least some embodiments, a user can capture image information of an object with a rear-facing camera for recognition while capturing image information of an environment or user using front-facing camera 104. The image information of the environment can then be used as an input for adjusting these recognition parameters for a given set of conditions.

Figure 2:
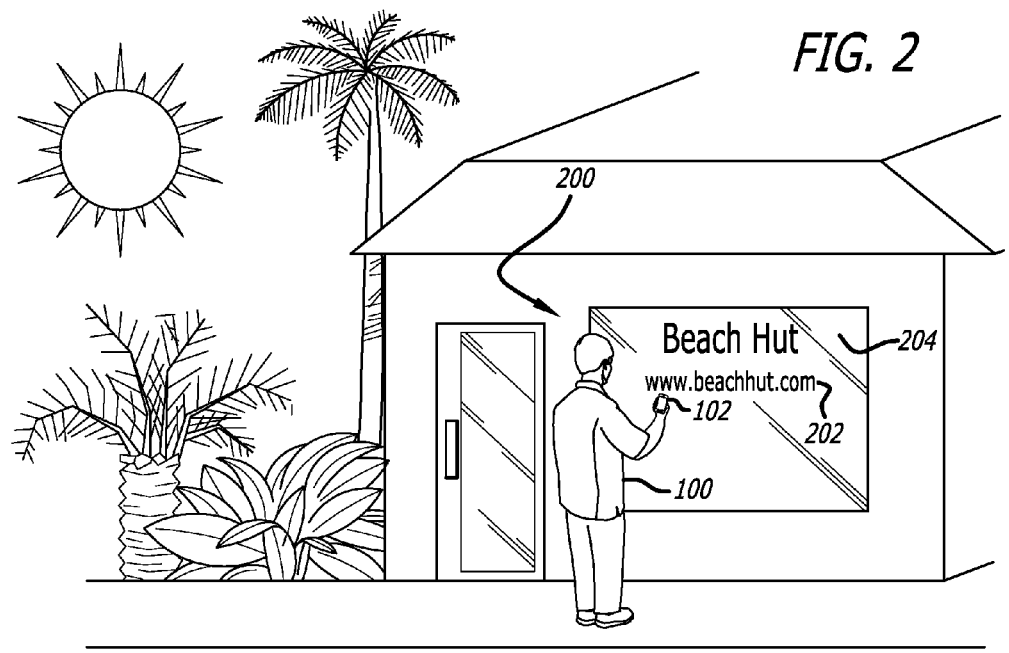
FIG. 2 illustrates an example of a user attempting to recognize text with a computing device during the day in accordance with at least one embodiment.

FIG. 2 illustrates an example situation 200 in which user 100 is attempting to recognize text of URL 202 with computing device 102 outside during the day, in accordance with at least one embodiment. Computing device 102, in this example, includes front-facing camera 104, a rear-facing camera, and an interface (e.g., a display element) that displays the field of view of the rear-facing camera. Accordingly, computing device 102 can be aimed in different directions and the interface can display an image of the current/active field of view being captured by the rear-facing camera. In accordance with at least one embodiment, instead of manually typing URL 202 into a web browser, user 100 can point the rear-facing camera at the text of URL 202 to recognize and subsequently navigate user 100 to a website for the restaurant while walking down the street.

FIGS. 3A-3D illustrate example image frames (300a, 300b, 300c, 300d) captured during the day in accordance with at least one embodiment. It should be understood that the images shown in each of FIGS. 3A-3D represent a small subset of potentially many image frames that computing device 102 may capture in a multi-frame continuous pipeline in an attempt to recognize text of URL 202. In at least one embodiment, image information (e.g., scanned images, photos, etc.) captured in substantially real-time can be analyzed to select individual image frames that meet or exceed certain selection criteria (e.g., focus, intensity, contrast, etc.) defined as adequate or acceptable for recognizing text while subject to a given set of environmental conditions and the parameters governing this selection criteria can be adjust based at least in part on this given set of environmental conditions (e.g., bright midday sunshine, at night, etc.).

Figure 3A:
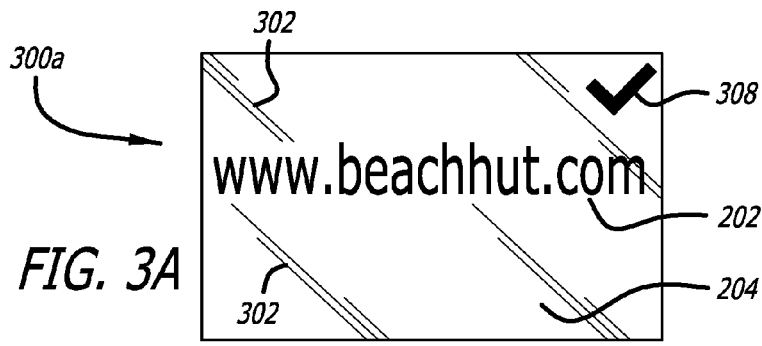
FIGS. 3A-3D illustrate example images, in accordance with at least one embodiment, captured by the user in FIG. 2.

Since bright midday sunlight often equates to apparent contrasts (which are ideal for text recognition) and since text is often represented against a contrasting background, the frame selection criteria for bright lighting can require high contrast between a potential character region in an image relative to a background. In this example, FIG. 3A shows frame 300a which is of relatively high quality. For example, the text of URL 202 is crisp and in good focus and the contrast between the text and window 204 is easily discernable. There is some glare 302, but the glare is not obscuring URL 202.

Figure 3B:
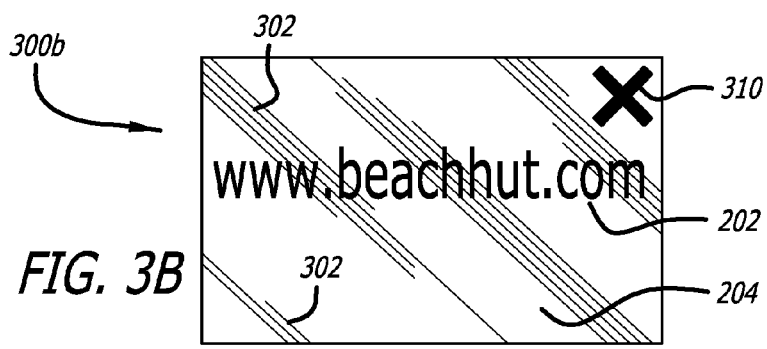

Accordingly, frame 300*a*, in this example, is determined to meet or exceed criteria (e.g., focus, intensity, contrast, etc.) which has been empirically defined as adequate 308 for text recognition in a sunny outdoor environment. In another example, FIG. 3B shows frame 300*b* which contains text that is crisp and in good focus, however, glare 302, in this example, is obscuring a large portion of URL 202. Since the text is so heavily obscured, frame 300*b* is determined to not meet the defined criteria based on exceeding a glare measure (e.g., containing too much glare per unit area) and will be discarded 310. Similarly, an image frame could be discarded for exceeding a shadow measure or an amount of shaded area within an image per unit area. In this example, computing device 102 may not be able to tell whether glare 302 is obscuring any text, however, upon analyzing frame 300*b* and determining that frame 300*b* contains greater than a threshold level of glare over a given area, frame 300*b* could discarded.

Figure 3C:
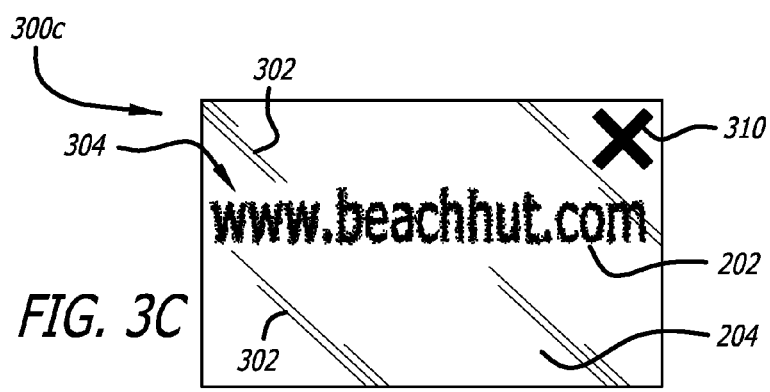
Figure 3D:
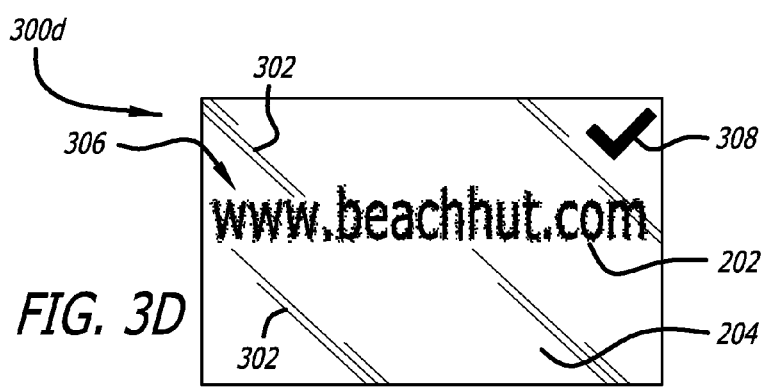

FIG. 3C, in this example, shows frame 300*c* which is heavily out of focus 304. In the presence of an apparent or easily discernable contrast, the blurriness or focus measure on an image becomes less important, however, in this example, frame 300*c* is so heavily out of focus 304 that it exceeds the focus measure empirically defined for this set of environmental conditions and is, therefore, discarded 310. FIG. 3D, in this example, shows frame 300*d* which is only slightly blurry 306. Unlike in FIG. 3C, the focus measure for frame 300*d*, given the high degree of contrast between character and background regions, is determined to at least meet the focus measure value defined as adequate 308 for this set of environmental conditions. However, had the lighting of frame 300*d* been dimmer or the contrast been less apparent, as will be explained with respect to FIGS. 5A-5D, frame 300*d* may likely not have met the defined criteria for these environmental conditions. Accordingly, frames 300*a* and 300*d* are determined to at least meet the criteria adequate 308 for text recognition for this set of environmental conditions and, therefore, pass for further processing.

Figure 4:
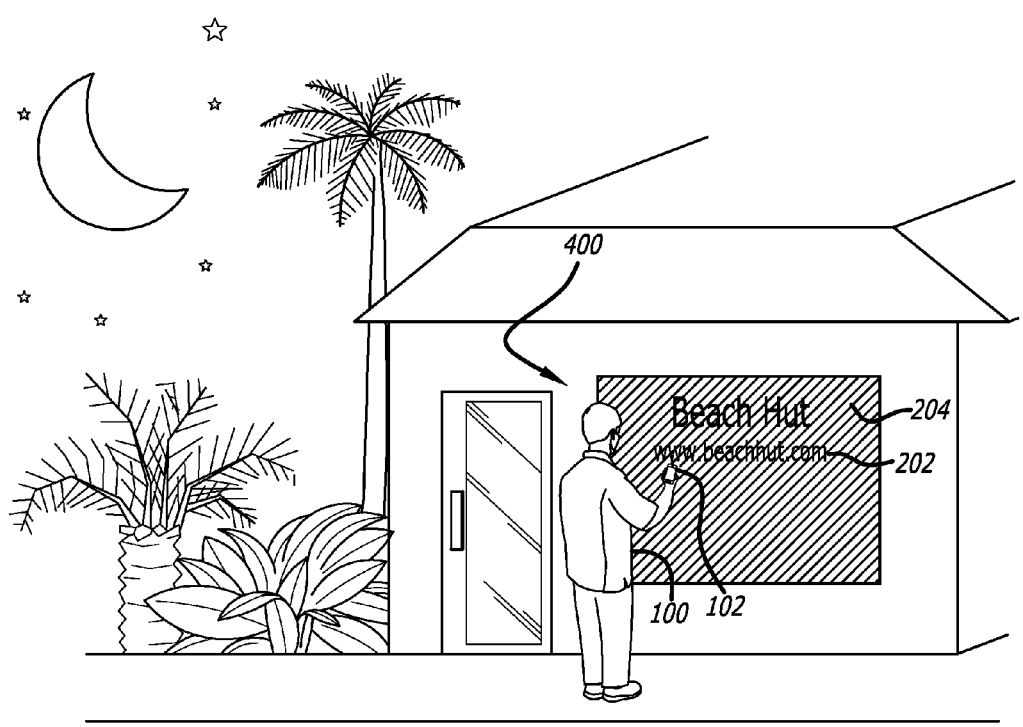
FIG. 4 illustrates an example of a user attempting to recognize text with a computing device at night in accordance with at least one embodiment.
Figure 5A:
FIGS. 5A-5D illustrate example images, in accordance with at least one embodiment, captured by the user in FIG. 4.
Figure 5B:

By contrast, FIG. 4 illustrates an example situation 400 in which user 100 is attempting to recognize text of URL 202 with computing device 102 at night, in accordance with at least one embodiment. In this example, the lighting provided by the environment is much lower relative to the lighting of FIG. 2, therefore, creating a different set of challenges for the recognition algorithms. Accordingly, FIGS. 5A-5D illustrate example image frames (500*a*, 500*b*, 500*c*, 500*d*) captured by user 100 at night in accordance with at least one embodiment. In this example, the lower lighting conditions cause the contrast between the text regions of URL 202 and the background regions to be lower relative to the contrast shown in FIGS. 3A-3D. In this example, FIG. 5A shows frame 500*a* which, given the current lighting conditions, is of relatively high quality. For example, URL 202 contains a high focus measure value and the contrast between URL 202 and window 204 is discernable, although not as apparent as in FIGS. 3A-3D. Accordingly, frame 500*a*, upon being analyzed, is determined to meet or exceed criteria (e.g., focus, intensity, contrast, etc.) defined as adequate 502 for text recognition. In another example, FIG. 5B shows frame 500*b* which is only slightly blurry. Unlike in FIG. 3D, where the high degree on contrast was able to lower the acceptable range of focus measure values for frame 300*d*, the low degree of contrast between character and background regions necessitates a higher focus measure in order for a recognition algorithm to clearly define and identify edges between these regions. Therefore, frame 500*d* is determined to not meet the empirically defined criteria for an image captured at night and will, therefore, be discarded 504.

Figure 5C:
Figure 5D:

FIG. 5C shows frame 500*c* which is blurrier and, therefore, contains an even lower focus measure than frame 500*b*. Accordingly, frame 500*c* will also be discarded 504 since it does not meet the defined criteria for an image captured in these lighting conditions. In another example, FIG. 5D shows frame 500*d* which is also considered relatively high quality for the given the current lighting conditions. In this example, the background value corresponding to window 204 is even closer to the value of the text of URL 202 relative to FIG. 5A, however, frame 500*d* contains a focus measure value that is high enough for the given contrast. Accordingly, frame 500*d*, upon being analyzed, is determined to meet or exceed criteria defined as adequate 502. Accordingly, in this example, frames 500*a* and 500*d* are determined to at least meet the criteria adequate 502 for text recognition for this set of environmental conditions and pass for further processing.

In at least one embodiment, the values of these frame selection parameters (e.g., a focus measure, a contrast measure, a light intensity measure, a glare measure, a shadow measure, etc.) can be determined for each of a set of environmental conditions empirically based on observation. In one example, a set of predetermined values can be automatically applied to a set of images for a particular range of determined conditions. For example, for high light conditions, a focus measure of 0.5 and above is acceptable while processing 50 image frames and a focus measure of 0.85 and above could be defined as acceptable while processing 100 image frames for low light conditions. In these examples, the definition of high, medium, and low light can be based on a range of light intensities. Alternatively, the values for the selection parameters can be determined based on a continuous function where, for example, each light intensity value corresponds to a different require focus measure and contrast value for a required number of frames processed. It should be understood that such predetermined conditions or such a function could include fewer or more parameters discussed above. For example, the light conditions for a user attempting to recognize text carved in granite (e.g., where the text is only slightly darker than the background based on shadows created by carvings in the stone) could be high, however, since there is relatively little contrast between the text and background (i.e., one is a slightly darker shade of grey than the other), a greater focus measure could be required to clear identify the text boundaries.

FIGS. 6A and 6B illustrate example magnified view of image frame 300*a* captured during the day and image 500*a* captured at night in order to further describe how different levels of contrast can effect frame selection, in accordance with various embodiments. For example, the contrast between text of URL 202 and background (i.e., window 204) for image frame 300*a* captured outdoor (or as in other high lighting conditions) is higher relative to image frame 500*a* captured, at night, in dimmer lighting conditions. Accordingly, the higher contrast, the more pronounced or defined the edges or regions of text appear, thereby, making binarization and eventually recognition easier and more accurate. The contrast between text of URL 202 and background (i.e., window 204) for images, such as image frame 500*a*, captured at night, indoors, or in other low lighting conditions, however, tend to be much lower relative to images captured in higher lighting conditions. As a result, pixel values of text of URL 202 of image frame 500*a* may only be slightly lower than the background (i.e., window 204) and, therefore, more effort may be required to properly identify the text from the background.

FIGS. 7A and 7B illustrate example graphs showing contrast and threshold values for the different lighting conditions of image frame 300a and image frame 500a in accordance with various embodiments. FIG. 7A illustrates an example intensity versus position graph that corresponds to the pixel intensity along line 600a of frame 300a from FIG. 6A. Since frame 300a is captured during the day in high lighting conditions, the contrast is almost as high as is possible. In this example, the background (i.e., window 204) has an intensity value of 1.0 and text of URL 202 has an intensity value around 0.1. For images captured in high lighting conditions, threshold values for defining text and background regions can be set relatively far apart since, under such high lighting conditions, a high contrast between the text and background are expected. Accordingly, in this example, background threshold 700a for high lighting conditions is defined at approximately 0.8, therefore, any region meeting or exceeding an intensity of 0.8 will be designated as background. Similarly, text threshold 702a for high lighting conditions is defined at approximately 0.3, therefore, any region with an intensity value less than 0.3 will be designated as text.

FIG. 7B illustrates an example intensity versus position graph that corresponds to the pixel intensity along line 600b of frame 500a from FIG. 6B. Since frame 500a is captured at night under relatively low lighting conditions, the contrast between text and background is relatively low. In this example, the background (i.e., window 204) has an intensity value of 0.5 and text of URL 202 has an intensity value around 0.1. In contrast to images captured in high lighting conditions, threshold values defining text and background regions for low lighting conditions are set relatively close to each other since the contrast between the text and background is expected to be low. In this example, background threshold 700b for low lighting conditions is defined at approximately 0.4, therefore, any region meeting or exceeding an intensity of 0.4 will be designated as background. Similarly, text threshold 702b for high lighting conditions is defined at approximately 0.2, therefore, any region with an intensity value less than 0.2 will be designated as text.

Similar to determining the frame selection parameters, these threshold values can be determined for each of a set of environmental conditions empirically based on observation. For example, in high lighting conditions or images with high contrasts, the focus measure can be less of a factor, thereby, enabling the images to be slightly blurry or out of focus while retaining the same precision. The focus measure, however, is much more important for images captured in dimmer lighting conditions where the threshold values between text and background regions are closer together, as can be seen in FIG. 7B. Accordingly, the focus measure (i.e., having a clear border or edge) becomes increasingly important as the difference between character and background threshold values becomes smaller and their respective intensity values converge. Further, a computing device may need to process more images captured in dimmer lighting conditions relative to a number of images captured in high lighting conditions to achieve the same level of precision.

FIG. 8 illustrates steps of an example process 800 for adjusting image processing parameters for text recognition using input from a secondary camera in accordance with some embodiments. It should be understood that, for this and other processes discussed herein, there can be additional, fewer, or alternative steps, performed in similar or alternative steps, or in parallel, within the scope of the various embodiments unless otherwise stated. For example, a mobile computing device can capture first image information of text using a first camera 802, such as a rear-facing camera, while capturing second image information of the environment with a second camera 804, such as a front-facing camera.

In at least one embodiment, the second image information of the environment can then be analyzed to determine the environmental conditions under which the images are being captured 806. For example, the image can be analyzed to determine whether the text in the images is being captured outdoor, indoor, under high lighting conditions, low lighting conditions, in an environment with a single light source or multiple light sources, and the like. In one embodiment, object matching can be used to determine the environment. For example, using the front-facing camera, if the computing device detects blue sky, clouds, trees, street signs, or the like, the computing device can, using an object matching algorithm, determine that the image is being captured outside. Additionally, text captured in the second image information, such as street signs, the names of business, and the like can also be recognized to determine whether the user is indoor or outdoor. Accordingly, this information along with the time of capture can indicate that the environment is bright (i.e., outside when the sun is out). Other techniques can also be used. For example, Global Positioning System (GPS) data can be used to determine the location of the computing device when the images are captured. If the device is in a location where there are no buildings, such as a park, during daylight hours, the computing device can run frame selection for high light conditions. Similarly, if the user is in a park at night, the computing device can run frame selection for low light conditions. Further, any combination of these techniques can be used in conjunction with a light intensity measurement taken by a camera or light intensity sensor of the computing device.

Based at least in part on this determined environment, a set of frame selection parameter that define criteria for selecting frames of the captured text, are determined 808. These parameters can include defined values for the focus or sharpness, intensity, contrast, number of frames to be processed, and others for a given environment. As discussed above, the values of these frame selection parameters (e.g., a focus measure, a contrast measure, a light intensity measure, a glare measure, a shadow measure, etc.) can be determined for each of a set of environmental conditions empirically based on observation and applied to the captured frames upon identifying a given set of conditions. In one example, a set of predetermined values can be automatically applied to a set of images for a particular range of determined conditions or the set of predetermined values can be used as inputs to a function for determining a particular combination selection parameters.

Accordingly, using the determined frame selection parameters, image frames are selected 810. Once a number of frames at least meeting the defined parameters have been selected, a background threshold value and a character threshold value can be determined based at least in part on the environment 812. Using these threshold values, the selected frames are binarized 814 and subsequently analyzed by an OCR engine to recognize the text 816 (e.g., being recognized on the computing device, sent to a server for recognition, etc.). Accordingly, once the text is recognized, the computing device can provide the recognized text to an application executing on the device in order to perform a function (e.g., calling a number, opening a web browser, etc.) associated with the recognized text.

In at least one embodiment, image information captured of an environment can cause the computing device to select a dictionary or other textual reference located online or otherwise to help improve text recognition results. For example, the computing device may recognize a sombrero, maracas, or other items, using object recognition, often associated with a Mexican restaurant. In such an instance, the computing device may not initially be in a mode to recognize Spanish words, such as being in a mode where English words are given higher confidence values relative to Spanish words. In such an instance, an English word having a similar spelling to the correct Spanish word may be assigned a higher confidence value even though all the characters for the Spanish word are correct and the characters for the English word are not correct. Accordingly, upon recognizing that the user is likely in a Mexican restaurant, the computing device could reference a Spanish dictionary to aid in proper text recognition. In this instance, words in Spanish and English could be equally weighted if English was previously given a higher weight. Further, GPS information for the current location of the computing device could be used to determine the name of the restaurant in which the user is located, search the internet for a menu of the restaurant, and use words from the menu found online to aid in the text recognition process, assuming that the text the user is likely trying to recognize in the restaurant is a menu. Alternatively, in this example, text recognized in the environment could be used in addition to or instead of object recognition to determine the environment.

Figure 9A:
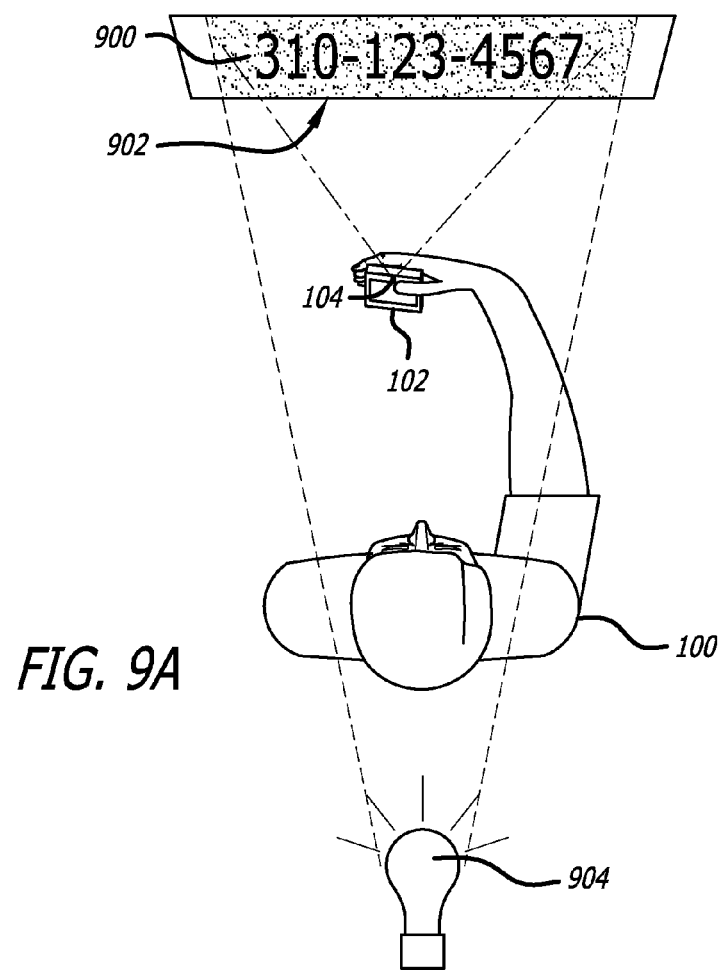
FIGS. 9A-9D illustrate an example process wherein a computing device notifies a user blocking a light source in accordance with at least one embodiment.

Further, a computing device can also provide feedback to the user in order to improve text recognition results. FIGS. 9A-9D conceptually illustrate an example process wherein computing device 102 notifies user 100 who is blocking light source 904 in accordance with at least one embodiment. FIGS. 9A-9D will be discussed in conjunction with FIG. 10 which illustrates steps for an example process 1000 for notifying user 100 blocking light source 904 in accordance with some embodiments. In this example, image information of target text 900 is captured using a first camera (e.g., rear-facing camera) of computing device 102. Accordingly, FIG. 9A shows user 100 attempting to recognize target text 900. In this example, however, user 100 standing in a location between light source 904 and target text 900. In this example, computing device 102 is currently unable to recognize target text 900 because the location in which user 100 standing is causing an inadequate amount of light from reaching target text 900. Based at least in part on analyzing images captured using a second camera (e.g., front-facing camera 104), computing device 102 can determine 1004 that user 100 is located between target text 900 and light source 904, thereby, blocking light from light source 904 and causing shadow 902 to cover some of target text 900. In one example, computing device 102 may determine that user 100 is located between target text 900 and light source 904 by tracing ray lines to a light source in the image information captured by front-facing camera 104.

Figure 9B:
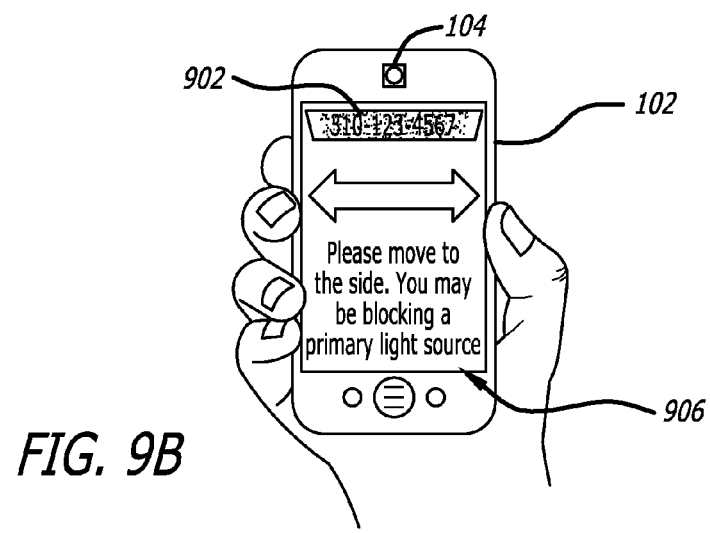
Figure 9C:
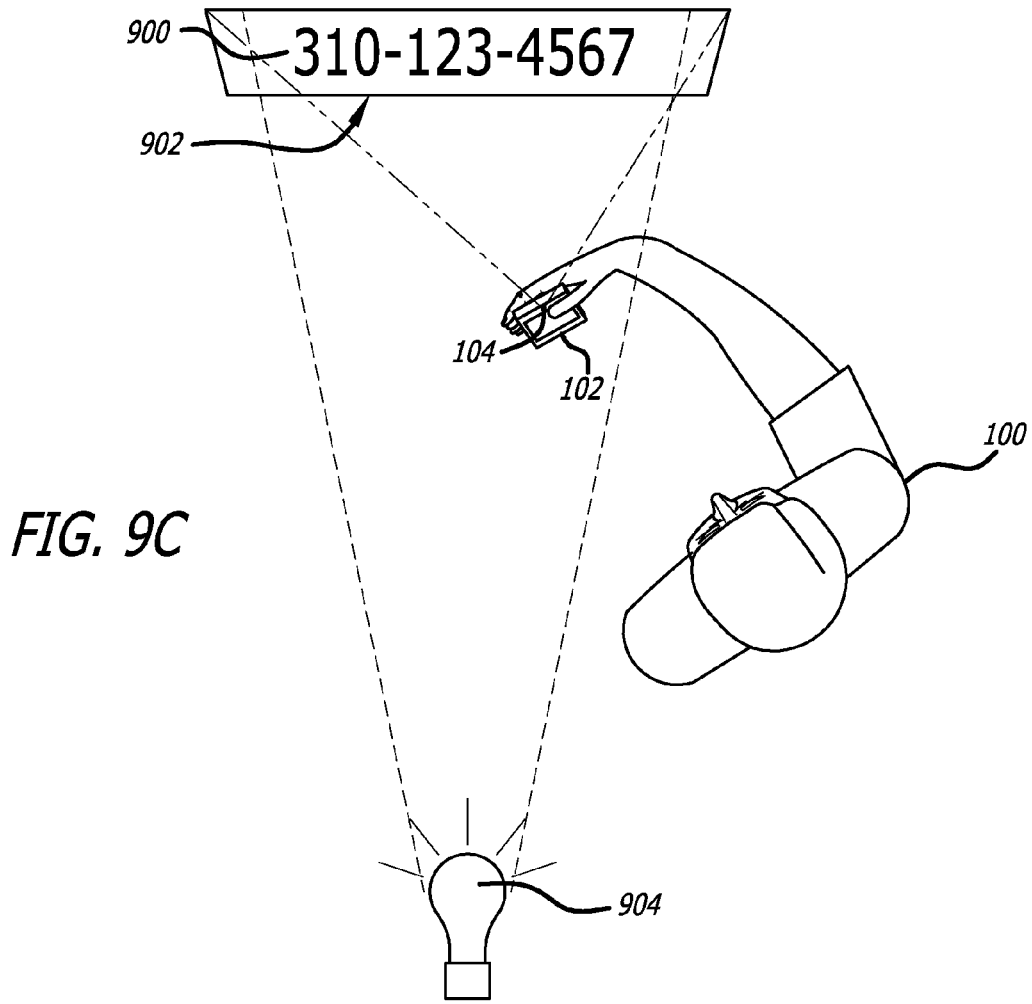
Figure 9D:
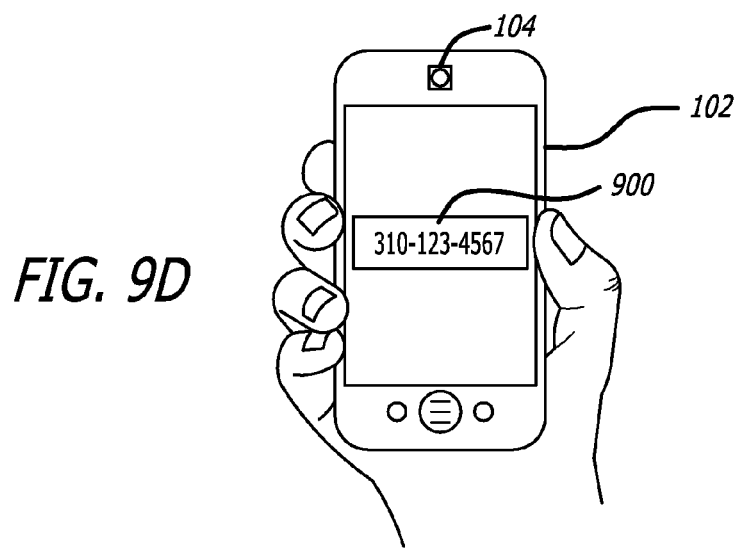
Figure 10:
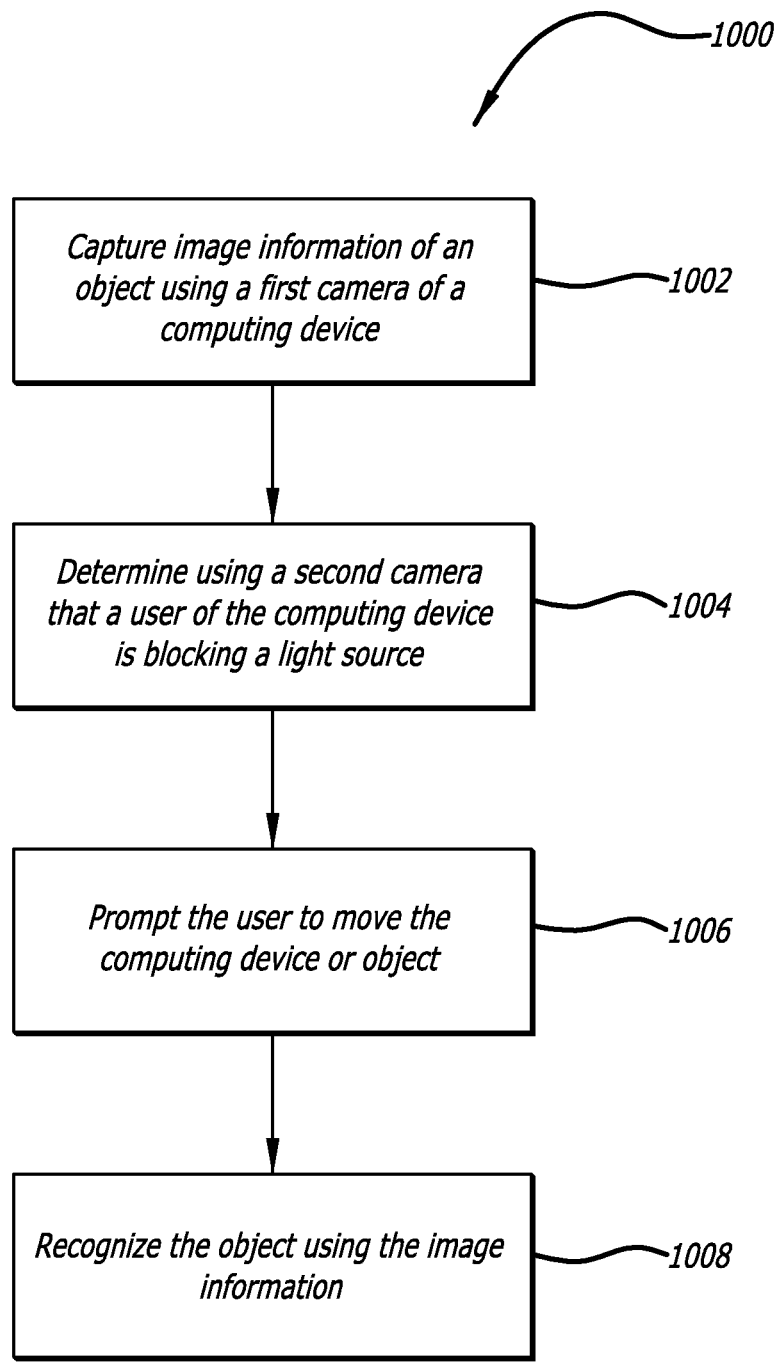
FIG. 10 illustrates steps of an example process for notifying a user blocking a primary light source in accordance with some embodiments.

In at least one embodiment, computing device 102 can prompt 906 user 100 to move the device or target text 900 to a different location 1006 relative to light source 904 or to adjust the lighting in order to help improve the text recognition results for target text 900, as shown in FIG. 9B. In this example, FIG. 9B shows computing device 102 displaying image information for target text 900 that is partially covered or blocked by shadow 902 caused by user 100 along with prompt 906 asking user 100 to "Please move to the side. You may be blocking a primary light source." Accordingly, FIG. 9C shows user 100 in a second location to the side in response to prompt 906 and, therefore, away from the first location where user 100 was blocking light from light source 904 from reaching target text 900. In this example, once target text 900 is adequately illuminated, computing device 100 can cause target text 900 to be processed and recognized 1008. Accordingly, FIG. 9D shows computing device 100 displaying recognized text for target text 900 which, in this example, is a phone number.

In another example, text or object recognition results captured using the first camera can be displayed to a user while capturing images of the user's facial expressions with the second camera. FIGS. 11A-11D conceptually illustrate an example process wherein computing device 102 processes additional image frames based on user facial expressions in accordance with at least one embodiment. FIG. 11A shows first recognition result 1100 (www.beaehnut.com) for URL 202 (www.beachhut.com) displayed to user 100. First recognition result 1100 could, for example, be based on analyzing a first set of image frames (e.g., 50 frames), partly in an attempt to conserve computing resources and power. In this example, however, first recognition result 1100a includes multiple misrecognized characters. For example, the OCR process has mistaken the letter 'c' for an 'e' and the letter 'h' for an 'n' in first recognition result 1100a (www.beaehnut.com). Accordingly, as first recognition result 1100 is displayed to user 100, image information of user 100 can be captured by front-facing camera 104 in an attempt to determine the user's satisfaction with the displayed results, which can be classified based on their facial expression using machine learning techniques. In this example, since the OCR process has misrecognized a few characters in first recognition result 1100, user 100 is frustrated. Accordingly, FIG. 11B illustrates user 100 showing their displeasure with first recognition result 1100 with frustrated facial expression 1110.

In response to determining that user 100 is frustrated with first recognition result 1100, computing device 102 can perform a preprocessing operation that includes capturing and analyzing an additional number of image frames (e.g., 100 frames) and merging the results of all analyzed frames (e.g., 150 frames) in an attempt to determine a more accurate result. In this example, FIG. 11C shows computing device 102 displaying second recognition result 1104 (www.beachhut-.com). Accordingly, second recognition result 1104 is the correct result and user 100, as shown in FIG. 11D, is no longer frustrated and is showing their satisfaction for second recognition result 1104 with content facial expression 1120. Accordingly, user 100 can subsequently select icon 1102 or URL 202 to be navigated to the corresponding web page, in this example. Further, it should be understood that although text was used to illustrate a user's satisfaction with a recognized result, other physical items using object matching or object recognition can also make use of the teachings discussed herein.

FIG. 12 illustrates steps of an example process 1200 for processing additional image frames based on user facial expressions in accordance with some embodiments. In this example, first image information of an object (e.g., text, landmark, brand logo, product available for purchase from an electronic marketplace, etc.) is captured 1202 using a first camera (e.g., rear-facing camera) of computing device 102. The object is recognized 1204 by analyzing the first image information with an object recognition algorithm (e.g., OCR algorithm, object matching algorithm, etc.). In this example, recognition results can be displayed 1206 to user 100 while second image information of user 100 are captured 1208 using camera 104. Accordingly, using the second image information of user 100, the user's response or reaction to the displayed recognition results is classified 1210 based on the user's facial expression. For example, the facial expressions classifier could be trained based at least in part on a data set obtained through the International Conference on Machine Learning.

Based on the classification of the user's facial expression, computing device 102 can determine whether user 100 is happy or frustrated with the recognition results currently being displayed in front of them. If the user's facial expression indicates that they are frustrated (i.e., the results were not properly recognized), as discussed with respect to FIGS. 11A-11D, computing device 100 can capture and analyze an additional number of image frames and merge the results of all analyzed frames in an attempt to determine a more accurate result. In this example, computing device 100 determines that the user's facial expression corresponds to displeasure with the displayed recognition results 1212. Accordingly, second image information of the object is captured using the first camera 1214 and the object is subsequently recognized using all analyzed frames of the first and second image information 1216. The second object recognition results are then displayed to the user 1218.

Additionally, feedback can also be sent to user 100 based on some frame quality measurement. For example, computing device 102 could ask user 100 to move closer, move back, notify user 100 that the light is too dark, or the like. Further, information for misrecognized images and their corresponding results can be stored as a negative example and these examples can be investigated in an attempt to improve future recognition results. For example, the user's facial expressions for a variety of recognized results can be stored and used to train a recognition algorithm to recognize facial expression of the user that correspond to a given recognized result using a machine learning. If, however, the user's facial expression indicates that they are happy or content with the first recognition results being displayed to them, computing device 100 can stop analyzing additional frames in order to save power and computational resources. Further, users can be divided into different groups and new features or products can be provided to some groups in order to gauge their reaction. Their reaction as they open or engage with this new feature or product can be compared between different control and treatment groups to improve features that users don't like, and promote the features they are happy about.

Figure 13:
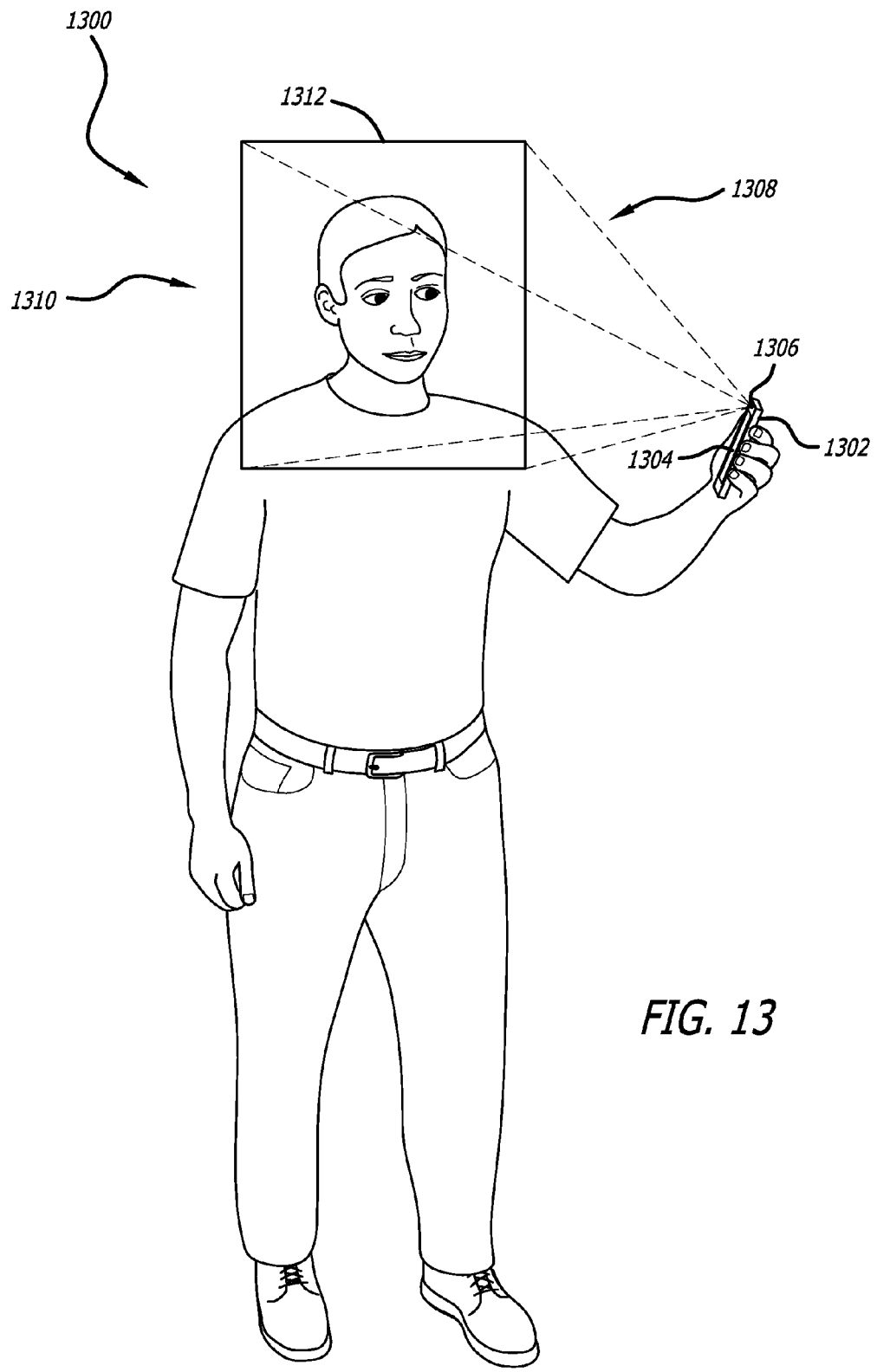
FIG. 13 illustrates an example technique for recognizing user facial expressions in accordance with various embodiments.

In order to determine a user's facial expressions, the device in at least some embodiments can determine the relative position of the user relative to the device, as well as dimensions or other aspects of the user at that position. For example, FIG. 13 shows example situation 1300 where computing device 1302 includes display screen 1304 and one or more cameras or other such capture elements 1306 operable to perform functions such as image and/or video capture. The image capture elements 1306 may be, for example, a camera, a charge-coupled device (CCD), a motion detection sensor, or an infrared sensor, and the like. In FIG. 13, the head of user 1310 is positioned 1312 within field of view 1308 of one of the image capturing elements 1306. In this example, the computing device 1302 captures one or more images of the user's face to analyze using a facial recognition process or other such application that is operable to locate the user's face and/or various landmarks or features that can be helpful in classifying the user's expressions. In at least some embodiments, the relative locations of these features can be compared to a library or set of facial feature locations for various expressions, in order to attempt to match the relative features locations with the stored feature locations for a given expression. Various pattern or point matching algorithms can be used for such processes as known in the art. If the relative point distribution, or other such data set, matches the information for an expression with at least a minimum level of confidence, the user can be determined to exhibit an emotion corresponding to the matching expression.

Figure 14A:
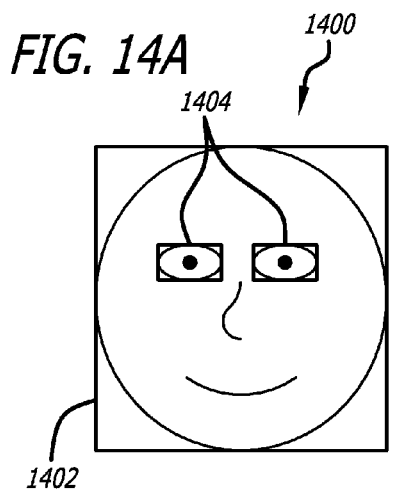
FIGS. 14A-14F illustrate example approaches to determining a user's gaze direction that can be used in accordance with various embodiments.

Another example technique that can be used in determining the facial expression of a user is described with respect to FIGS. 14A-14F. In this example, various approaches attempt to locate one or more desired features of a user's face to determine various useful aspects for determining the relative location or orientation for different expressions. For example, an image can be analyzed to determine the approximate location of a user's eyes, eyebrows, mouth, etc. FIG. 14A illustrates an example wherein the approximate position and area of a user's head or face 1400 is determined and a virtual "box" 1402 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1404 of each of the user's eyes (or in some cases the eyes in tandem). By determining the location of the user's eyes as well, advantages can be obtained as it can be more likely that the image determined to be the user's head actually includes the user's head.

Figure 14B:
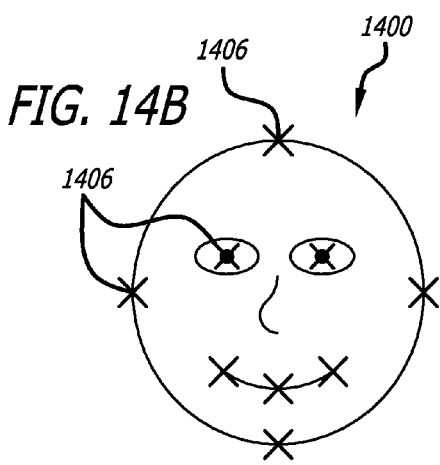

Various other algorithms can be used to determine the location of features on a user's face. For example, FIG. 14B illustrates an example method where various features on a user's face are identified and assigned a point location 1406 in the image. The system thus can detect various aspects of a user's features. Such an approach provides advantages over the general approach of FIG. 14A in certain situations, as various points along a feature can be determined, such as the end points and at least one center point of a user's mouth and eyebrows.

Figure 14C:
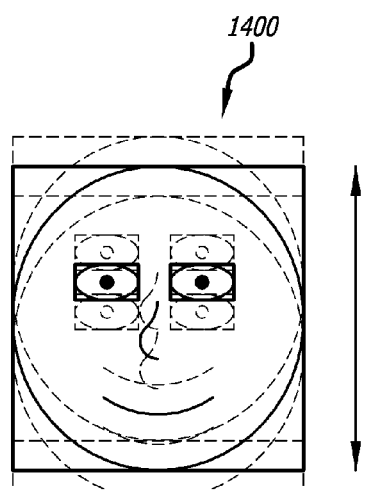
Figure 14D:
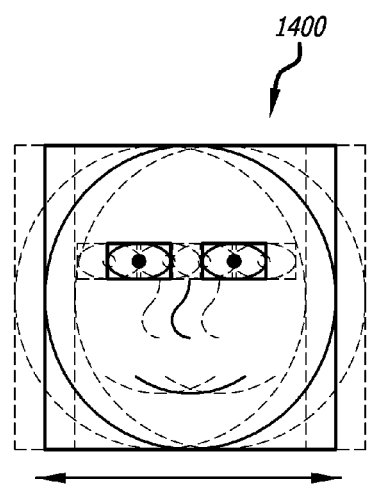
Figure 14E:
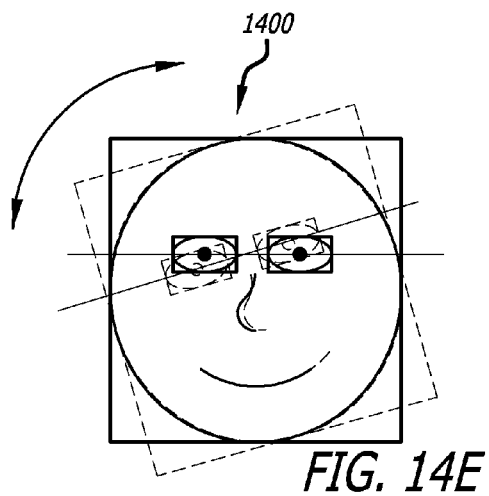

Once the positions of facial features of a user are identified, relative motion between the features can be detected. For example, FIG. 14C illustrates an example where the user's head 1400 is moving up and down with respect to the viewable area of the imaging element. As discussed, this could be the result of the user shaking his or her head, or the user moving the device up and down, etc. FIG. 14D illustrates a similar example wherein the user is moving right to left relative to the device, through movement of the user, the device, or both. As can be seen, each movement can be tracked as a vertical or horizontal movement, respectively, and each can be treated differently. As should be understood, such a process also can detect diagonal or other such movements. FIG. 14E further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted.

Figure 14F:
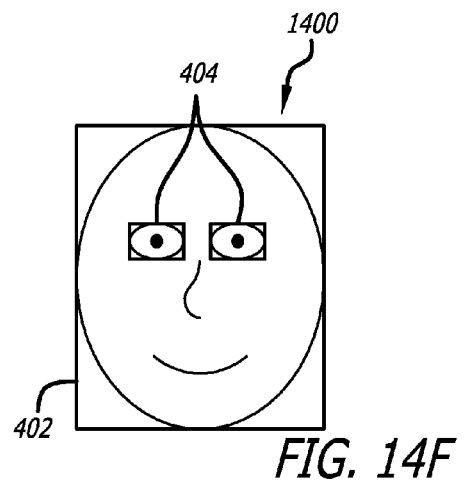

FIG. 14F illustrates another advantage of using an approach such as that described with respect to FIG. 14B to determine the position of various features on a user's face. In this exaggerated example, it can be seen that the features of a second user's head 1408 have a different relative position and separation. Thus, the device also can not only determine positions of features for a user, but can distinguish between different users. Also, the device can be configured to detect how close a user is to the device based on, for example, the amount and ratio of separation of various features, such that the device can detect movement towards, and away from, the device.

The processing component processes the image in the active field of view of the camera to detect text in the image. For example, the processing component can implement algorithms that detect and recognize the location of text in the image, and the region of the image that includes the text can be cropped to create a region of cropped text. The region of cropped text can be binarized. Thereafter, the region of binarized text is communicated to the server. Alternatively, in accordance with an embodiment, a grey scale image, color image or any other image (cropped or otherwise not cropped) can be communicated to the server (or remain on the mobile computing device) for further processing.

Figures 15A, 15B:
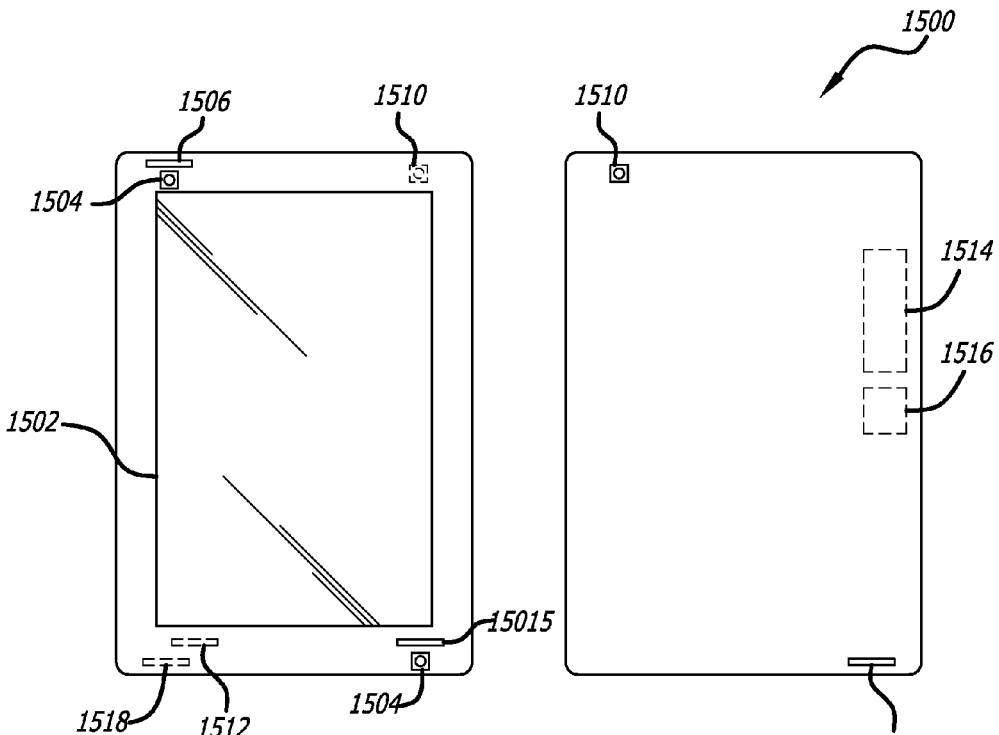
FIGS. 15A and 15B illustrate an example computing device that can be used to implement aspects of various embodiments.

FIGS. 15A and 15B illustrate front and back views, respectively, of an example computing device 1500 that can be used in accordance with various embodiments. Although a mobile computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1500 has a display screen 1502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1504 on the front of the device and at least one image capture element 1510 on the back of the device. It should be understood, however, that image capture elements could also, or alternatively, be placed on the sides or corners of the device, and that there can be any appropriate number of capture elements of similar or different types. Each image capture element 1504 and 1510 may be, for example, a camera, a charge-coupled device (CCD), a motion detection sensor or an infrared sensor, or other image capturing technology.

As discussed, the device can use the images (e.g., still or video) captured from the imaging elements 1504 and 1510 to generate a three-dimensional simulation of the surrounding environment (e.g., a virtual reality of the surrounding environment for display on the display element of the device). Further, the device can utilize outputs from at least one of the image capture elements 1504 and 1510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1508 on the front side, one microphone 1512 on the back, and one microphone 1506 on or near a top or side of the device. In some devices there may be only one microphone, while in other devices there might be at least one microphone on each side and/or corner of the device, or in other appropriate locations.

The device 1500 in this example also includes one or more orientation- or position-determining elements 1518 operable to provide information such as a position, direction, motion, or orientation of the device. These elements can include, for example, accelerometers, inertial sensors, electronic gyroscopes, and electronic compasses.

The example device also includes at least one communication mechanism 1514, such as may include at least one wired or wireless component operable to communicate with one or more electronic devices. The device also includes a power system 1516, such as may include a battery operable to be recharged through conventional plug-in approaches, or through other approaches such as capacitive charging through proximity with a power mat or other such device. Various other elements and/or combinations are possible as well within the scope of various embodiments.

Figure 16:
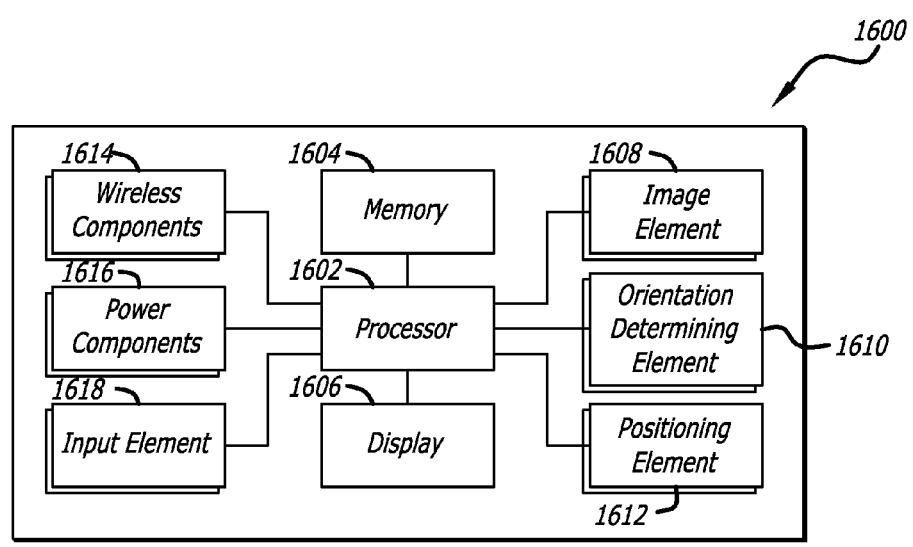
FIG. 16 illustrates example components that can be used with a device such as that illustrated in FIGS. 15A and 15B.

FIG. 16 illustrates a set of basic components of an electronic computing device 1600 such as the device 1500 described with respect to FIG. 15. In this example, the device includes at least one processing unit 1602 for executing instructions that can be stored in a memory device or element 1604. As would be apparent to one of ordinary skill in the art, the device can include many types of memory, data storage, or computer-readable media, such as a first data storage for program instructions for execution by the processing unit(s) 1602, the same or separate storage can be used for images or data, a removable memory can be available for sharing information with other devices, and any number of communication approaches can be available for sharing with other devices.

The device typically will include some type of display element 1606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1600 also includes at least one orientation determining element 1610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 17:
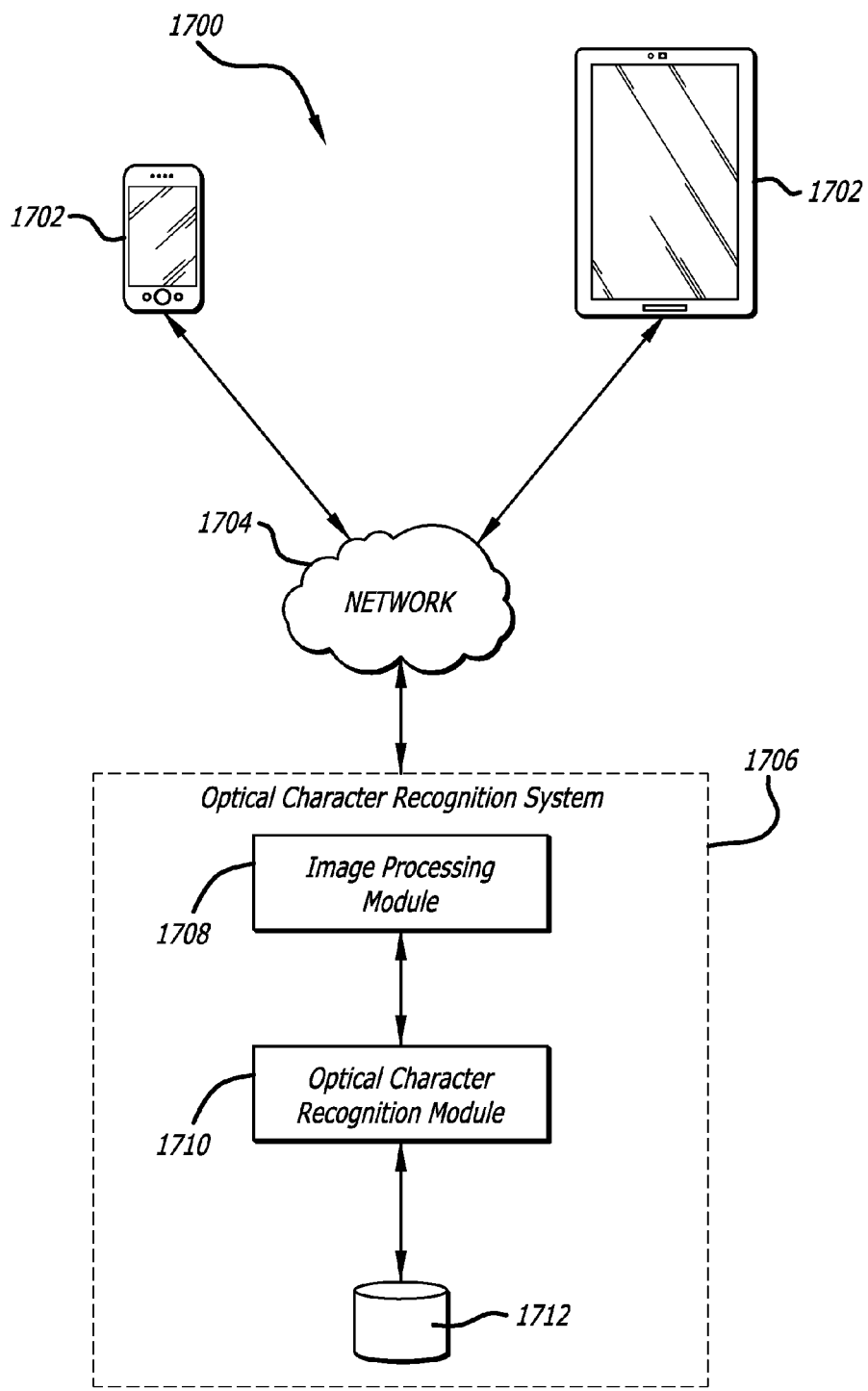
FIG. 17 illustrates an example environment in which various embodiments can be implemented.

FIG. 17 is an example environment 1700 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 1702, such as a personal computer, tablet computer, smart phone, and the like, to access an Optical Character Recognition system or service 1706 over at least one appropriate network 1704, such as a cellular network, the Internet, or another such network for communicating digital information. The client device 1702 can capture one or more images (or video) of text and send the images to the Optical Character Recognition system or service 1706 over the at least one appropriate network 1704. The Optical Character Recognition system 1706 includes an image-processing module 1708 that can apply different operators or techniques to pre-process the images before submitting the images to one or more optical character recognition modules 1710. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 1710 concurrently recognizes text from the image to produce multiple recognized text outputs. In at least one embodiment, a processor can analyze the recognized text using a database 1712 of words in order to improve the recognition. The database 1712 includes a set of words which the processor can search for matches corresponding to words present in the recognized text. At least a portion of these tasks can be performed on a mobile computing device or by using at least one resource available across a network as well. In at least some embodiments, an OCR application will be installed on the client device 1702, such that much of the processing, analyzing, or other such aspects can be executed on the client device. Various processing steps can be performed by the client device 1702, by the Optical Character Recognition system 1706, or a combination thereof. Therefore, it should be understood that the components and capabilities of the Optical Character Recognition system 1706 could wholly or partly reside on the client device 1702.

Figure 18:
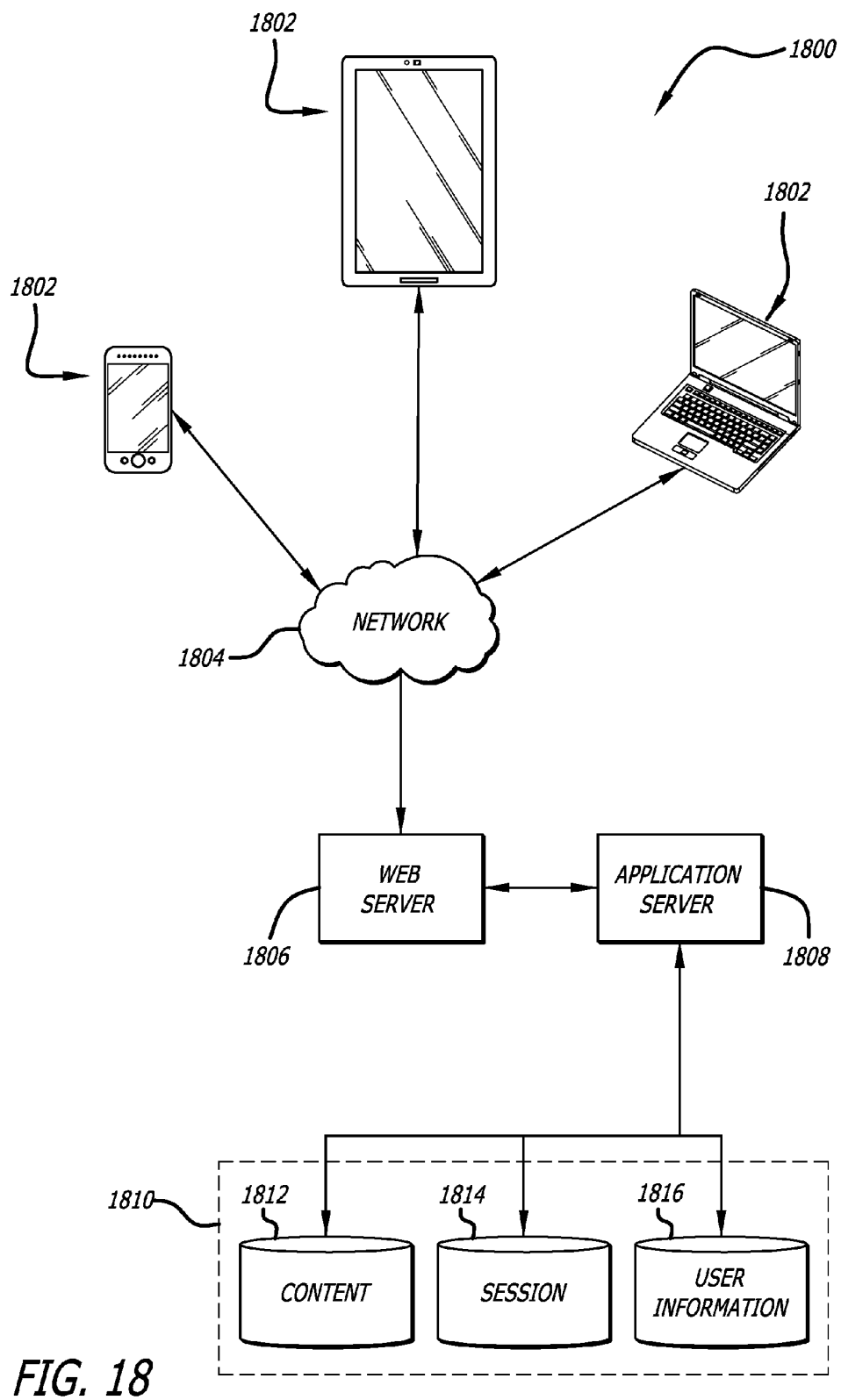
FIG. 18 illustrates another environment in which various embodiments can be implemented.

As discussed, different approaches can be implemented in various environments in accordance with the described embodiments. For example, FIG. 18 illustrates an example of an environment 1800 for implementing aspects in accordance with various embodiments. As will be appreciated, although a Web-based environment is used for purposes of explanation, different environments may be used, as appropriate, to implement various embodiments. The system includes an electronic client device 1802, which can include any appropriate device operable to send and receive requests, messages or information over an appropriate network 1804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1806 for receiving requests and serving content in response thereto, although for other networks, an alternative device serving a similar purpose could be used, as would be apparent to one of ordinary skill in the art.

The illustrative environment includes at least one application server 1808 and a data store 1810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1806 in the form of HTML, XML or another appropriate structured language in this example. The handling of all requests and responses, as well as the delivery of content between the client device 1802 and the application server 1808, can be handled by the Web server 1806. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing content (e.g., production data) 1812 and user information 1816, which can be used to serve content for the production side. The data store is also shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
   acquire, using a rear-facing camera of the computing device, a plurality of image frames;
   acquire, using a front-facing camera of the computing device, information corresponding to an environment of the computing device;
   determine one or more conditions of the environment of the computing device using the information acquired by the front-facing camera of the computing device;
   select, using at least one frame selection parameter associated with the one or more conditions, a first frame of the plurality of image frames for processing by an optical character recognition (OCR) engine in electronic communication with the computing device;
   determine at least one threshold for performing binarization of the first frame, wherein the at least one threshold is based on the one or more conditions;
   binarize, using the at least one threshold, at least a portion of the first frame; and
   cause the at least a portion of the binarized first frame to be processed using the OCR engine.

2. The non-transitory computer-readable storage medium of claim 1, wherein the instructions that, when executed by the at least one processor, further cause the computing device to binarize the at least a portion of the first frame by:
   determining a first portion of the first frame having pixel values above a character threshold value to be a character portion; and
   determining a second portion of the first frame having pixel values below a background threshold value to be a background portion.

3. The non-transitory computer-readable storage medium of claim 1, wherein the instructions that, when executed by the at least one processor, further cause the computing device to select the first frame by:
   determining a focus measure value or a contrast measure value.

4. The non-transitory computer-readable storage medium of claim 1, wherein the instructions that, when executed by the at least one processor, further cause the computing device to acquire information corresponding to an environment of the computing device by:
   acquiring an image with the front-facing camera;
   identifying an object in the image acquired by the front-facing camera; and
   comparing, using an object matching algorithm, the object to objects stored in a database.

5. A computer-implemented method, comprising:
   under the control of one or more computer systems configured with executable instructions,
      acquiring, using a first camera of a computing device, at least one first image;
      acquiring, using a second camera of the computing device, information corresponding to an environment of the computing device, wherein the second camera faces a different direction than the first camera;
      determine one or more conditions of the environment using the information acquired by the second camera of the computing device;
      determining at least one parameter associated with the one or more conditions;
      performing at least one preprocessing operation associated with the at least one first image, wherein the at least one preprocessing operation includes binarizing at least a portion of each of the at least one first image based upon the one or more conditions; and
      causing the at least one first image to be processed using an optical character recognition (OCR) engine in electronic communication with at least one of the one or more computer systems, wherein (i) the at least one parameter is used when performing the preprocessing operation or (ii) the at least one parameter is used by the OCR engine.

6. The computer-implemented method of claim 5, wherein the at least one preprocessing operation further includes:
   determining, based at least in part on the at least one parameter, a background threshold value or a character threshold value for text of the at least one first image, and
   wherein the binarizing uses the background threshold and the character threshold.

7. The computer-implemented method of claim 6, further comprising:
   determining that the environment is associated with at least one of high lighting conditions or a high contrast measure based at least in part on the at least one first image;
   causing, based on a determination that the environment is associated with at least one of high lighting conditions or a high contrast measure based at least in part on the at least one first image, the at least one parameter to include a first focus measure, wherein the first focus measure is lower than a second focus measure, the second focus measure associated with low lighting conditions or image frames having a low contrast measure; and causing, based on the determination, the background threshold to be defined at a first intensity value and the character threshold to be defined at a second intensity value, wherein the first intensity value and second intensity value are separated by a first difference, wherein the first difference is greater than a second difference, the second difference associated with low lighting conditions or image frames having low contrast measure.

8. The computer-implemented method of claim 5, further comprising:

determining, based on the at least one first image, that the environment is associated with at least one of a lowlighting condition or a low contrast measure; and causing, based on a determination that the environment is associated with at least one of a lowlighting condition or a low contrast measure based at least in part on the at least one first image, the at least one parameter to include a first focus measure, wherein the first focus measure is higher than a second focus measure, the second focus measure associated with a high lighting condition or high contrast environment.

9. The computer-implemented method of claim 8, further comprising:

causing, based on a determination that the environment is associated with at least one of a lowlighting condition or a low contrast measure based at least in part on the at least one first image, a set of additional images to be processed relative to the low lighting condition or the low contrast environment.

10. The computer-implemented method of claim 5, further comprising:

analyzing the information corresponding to the environment to identify objects captured by the second camera; and comparing, using an object matching algorithm, the objects captured by the second camera to objects stored in a database, wherein at least a portion of the objects stored in the database are associated with one of a plurality of environments.

11. The computer-implemented method of claim 5, wherein the information corresponding to the environment captured by the second camera is a representation of a face and the at least one parameter indicates a facial expression.

12. The computer-implemented method of claim 11, further comprising:

displaying a first recognition result from the OCR engine for the at least one first image;

determining, based at least in part on a first facial expression, dissatisfaction with the first recognition result;

acquiring, using the first camera, at least one second image; and causing the at least one second image to be processed using the OCR engine.

13. The computer-implemented method of claim 12, further comprising:

displaying a second recognition result for the at least one second image;

acquiring, using the second camera, information corresponding to a second facial expression; and determining, based at least in part on the second facial expression, satisfaction with the second recognition result.

14. The computer-implemented method of claim 5, further comprising:

determining current light intensity of the environment to be below a determined threshold;

determining, using the second camera, that an object is blocking a primary light source; and prompting a request for an action associated with at least one of moving to unblock the primary light source or adjusting lighting conditions of the environment.

15. The computer-implemented method of claim 5, further comprising:

analyzing the information corresponding to the environment to identify text captured by the second camera; and analyzing the text captured by the second camera to identify words corresponding to the environment.

16. A computing device, comprising:

a processor;

a display screen; and memory including instructions that, when executed by the processor, cause the computing device to:

acquire, using a first camera of the computing device, at least one first image;

acquire, using a second camera, information corresponding to an environment of the computing device, wherein the second camera faces a different direction than the first camera;

determine one or more conditions of the environment using the information acquired by the second camera of the computing device;

determine at least one parameter associated with the one or more conditions;

perform at least one preprocessing operation on the at least one first image, wherein the at least one preprocessing operation includes binarizing at least a portion of each of the at least one first image based upon the one or more conditions; and cause the at least one first image to be processed using an optical character recognition (OCR) engine in electronic communication with the computing device, wherein (i) the at least one parameter is used when performing the preprocessing operation or (ii) the at least one parameter is used by the OCR engine.

17. The computing device of claim 16, wherein the information corresponding to the environment captured by the second camera is a face and the at least one parameter indicates a facial expression, and wherein the instructions that, when executed by the processor, cause the computing device to:

display a first recognition result from the OCR engine for the at least one first image;

acquire, using the second camera, information corresponding to a first facial expression;

determine, based at least in part on the first facial expression, dissatisfaction with the first recognition result;

acquire, using the first camera, at least one second image; and cause the at least one second image to be processed using the OCR engine.

18. The computing device of claim 17, the instructions that, when executed by the processor, cause the computing device to:

display a second recognition result for the at least one second image;

acquire, using the second camera, information corresponding to a second facial expression; and determine, based at least in part on the second facial expression, satisfaction with the second recognition result.

19. The computing device of claim 17, wherein the instructions, when executed by the processor, further enable the computing device to:
- store facial expressions for a variety of recognized results; and
- train, using a machine learning algorithm, the computing device to recognize a facial expression corresponding to a given recognized result.

20. The computing device of claim 17, wherein the processor determines that dissatisfaction with the first recognition result by:
- comparing, using a feature matching algorithm, the first facial expression to a plurality of stored facial expressions, each of the stored facial expressions corresponding to a predetermined level of satisfaction.

* * * * *